United States Patent
Dai et al.

(10) Patent No.: US 10,109,844 B2
(45) Date of Patent: Oct. 23, 2018

(54) DUAL WELD PLUG FOR AN ELECTROCHEMICAL CELL

(71) Applicant: Greatbatch Ltd., Clarence, NY (US)

(72) Inventors: Xiangyang Dai, East Amherst, NY (US); Gary Freitag, East Aurora, NY (US); Kenneth L. Grubb, Snyder, NY (US); Paul T. Hallifax, Middleport, NY (US); Mark J. Roy, Buffalo, NY (US); Lou Serpe, Clarence Center, NY (US)

(73) Assignee: Greatbatch Ltd., Clarence, NY (US)

( * ) Notice: Subject to any disclaimer, the term of this patent is extended or adjusted under 35 U.S.C. 154(b) by 176 days.

(21) Appl. No.: 15/341,083

(22) Filed: Nov. 2, 2016

(65) Prior Publication Data

US 2018/0123112 A1    May 3, 2018

(51) Int. Cl.
*H01M 2/36* (2006.01)
*H01M 2/02* (2006.01)
*H01M 2/06* (2006.01)
*H01M 10/0525* (2010.01)
*H01M 6/04* (2006.01)
*B23K 26/211* (2014.01)
*B23K 101/38* (2006.01)
*B23K 103/00* (2006.01)
*B23K 103/18* (2006.01)

(52) U.S. Cl.
CPC .......... *H01M 2/367* (2013.01); *B23K 26/211* (2015.10); *H01M 2/024* (2013.01); *H01M 2/0207* (2013.01); *H01M 2/065* (2013.01); *H01M 2/361* (2013.01); *H01M 2/362* (2013.01); *H01M 6/045* (2013.01); *H01M 10/0525* (2013.01); *B23K 2201/38* (2013.01); *B23K 2203/18* (2013.01); *B23K 2203/54* (2015.10); *H01M 2220/10* (2013.01); *H01M 2220/20* (2013.01); *H01M 2220/30* (2013.01); *H01M 2300/0014* (2013.01)

(58) Field of Classification Search
CPC .. H01M 2/367; H01M 6/045; H01M 10/0525; H01M 2/065; H01M 2/362; H01M 2/361; H01M 2/024; H01M 2/0207; B23K 26/211
See application file for complete search history.

(56) References Cited

U.S. PATENT DOCUMENTS

| | | | |
|---|---|---|---|
| 5,776,632 A | 7/1998 | Honegger et al. | |
| 6,610,443 B2 | 8/2003 | Paulot et al. | |
| 6,613,474 B2 * | 9/2003 | Frustaci .............. | H01M 2/0202 429/163 |

(Continued)

*Primary Examiner* — Stewart A Fraser
(74) *Attorney, Agent, or Firm* — Michael F. Scalise

(57) ABSTRACT

The present invention is directed to an electrochemical cell having plate electrodes housed inside a mating "clamshell" casing. When mated together, the casing components are form-fitting with respect to the internal battery structure so as to reduce the overall size of the electrochemical package. A header assembly containing both a glass-to-metal seal opening for a terminal lead and an electrolyte fill opening is used in conjunction with the clamshell casing. The electrolyte fill opening is constructed with an elongated opening with at least two different radii. A first and second sealing element is welded within the electrolyte fill opening at different depths within the header to block the flow of electrolyte and form a hermetic seal.

22 Claims, 11 Drawing Sheets

(56) References Cited

U.S. PATENT DOCUMENTS

| | | | |
|---|---|---|---|
| 7,128,765 B2 * | 10/2006 | Paulot ................ | H01M 2/0202 29/623.1 |
| 2002/0132163 A1 * | 9/2002 | Paulot ................ | H01M 2/0202 429/180 |
| 2004/0031142 A1 * | 2/2004 | Paulot ................ | H01M 2/0202 29/623.2 |
| 2009/0035652 A1 * | 2/2009 | Freitag .................. | H01M 2/02 429/176 |
| 2017/0033349 A1 * | 2/2017 | Dai ........................ | H01M 2/26 |

* cited by examiner

DUAL WELD PLUG FOR AN ELECTROCHEMICAL CELL

BACKGROUND OF THE INVENTION

1. Field of the Invention

The present invention relates to an improvement in an electrochemical cell designed by enhancing the manufacture of a housing of the cell, particularly the closure of a fill port. The fill port is used to introduce an electrolyte into the housing of the electrochemical cell.

2. Prior Art

In prior and current product lines, the design of electrochemical cells includes a lid with separate ferrules or openings for providing a terminal pin feedthrough, and an electrolyte fill and closure mechanism. Designs for these functions usually consist of a lid, GTMS ferrule, and an electrolyte fill ferrule which are welded together to form a subassembly. This subassembly is further manufactured by having the GTMS inserted into its ferrule and the completed assembly is then welded into a battery case of various configurations. The battery is filled with electrolyte via the fill ferrule or area, and the fill mechanism comprising a single fill port covering is welded shut. U.S. Pat. No. 5,306,581 to Taylor et al. discloses one such example of an electrochemical cell comprising a single electrolyte fill port covering.

However, these electrochemical cells comprising single electrolyte fill covers are not desirable because these cell designs are typically prone to electrolyte leakage during manufacture. The welding operation of sealing the single cover of the fill port typically causes the electrolyte material near the fill port opening to heat and expel out of the casing of the cell before the welding process is complete and the lid is hermetically sealed. Expelled electrolyte material is not desirable because it generally interacts with the welded material causing discoloration of the weld and may potentially compromise the robustness of the hermetic seal of the electrolyte fill port over time.

Dual weld plug electrochemical cell designs such as the one disclosed in U.S. Pat. No. 6,610,443 to Paulot et al., incorporated herein by reference, were created to help alleviate this problem. In the '443 patent, Paulot discloses an electrochemical cell comprising a header assembly containing both a glass to metal seal opening for a terminal lead and an electrolyte fill opening comprising two inline openings. As shown in FIG. 8C, the Paulot fill port comprises a through bore having an upper and lower opening of differing diameters. A sealing element is positioned over the lower opening and mechanically pressed into an interference fit within the opening. After the lower sealing element is mechanically pressed into position, a second sealing element is positioned within the upper opening and welded shut.

However, the applicants of the present invention have discovered that merely pressing such a sealing element within the fill port opening, as disclosed by Paulot, is not sufficient in preventing potential leakage of electrolyte from within the cell during manufacture. Prior art double plug fill enclosure designs, such as Paulot's, depend on an interference fit of the lower plug within the fill hole to stop the potential leakage of electrolyte from within the electrochemical cell. Variations in plug dimensions and surface conditions increase the difficulty in precisely controlling the insertion force of the plug to minimize electrolyte leakage. In addition, heat from the welding of the sealing element to the case during manufacturing of the cell exacerbates these variations causing a potential break in the temporary seal, which then allows for the electrolyte to leak out from the case.

In addition, during welding of the upper sealing member, heat from the welding process typically expands the components of the cell, thereby possibly additionally compromising the interference fit of the lower sealing member. As a result, additional electrolyte material may leak out from the casing which may then interact with the welded material of the upper sealing member.

If any electrolyte material were to leak out, a cleaning process by which the expelled electrolyte material is removed from within the fill port opening is required before the fill port opening is hermetically sealed. Removal of electrolyte from within the fill port opening is not desirable. The relatively small diameter of the fill port opening increases the difficulty of electrolyte removal. The electrolyte removal process increases cost and time of manufacture of the electrochemical cell.

International patent publication number WO 92/10859 to Cretzmeyer et al. discloses an electrochemical cell also having a dual opening fill port design. As disclosed, an inner plug composed of a compressible material is positioned and mechanically pressed within an inner fill port opening. A helium holding material, such as glass beads, is positioned over the inner plug and a metal closure button is welded over the fill port opening, sealing the electrolyte within. However, like Paulot, the closure of the Cretzmeyer electrolyte fill port relies on a plug that is mechanically pressed within the lower fill port opening. Such a mechanically pressed plug does not adequately stop leakage of electrolyte material during welding of the fill port closure.

Thus, as previously stated, the problem with the prior art lid or header designs is that during the electrolyte fill port enclosure procedure, electrolyte material typically escapes out of the fill port thus resulting in a loss of electrolyte material. Furthermore, during welding of the fill port opening, heat from the welding causes localized heating of the metallic casing and electrolyte materials. This localized heating can cause the electrolyte to expel and leak out from within the casing. Such expulsion of the electrolyte material typically results in discoloration of the welded fill enclosure metal as the electrolyte material interacts with the welded metal. In addition, such an interaction of the electrolyte material with the fill opening enclosure material, during welding, may result in a change in the microstructure of the welded seal. Such a change in the weld microstructure may compromise the robustness of the hermetic seal over time.

The new design, the subject of the current patent application, thus reduces expulsion of electrolyte during cell assembly by utilizing a fill port opening comprising multiple welded seals. The new design allows for the creation of a hermetic electrolyte fill port opening with minimized or eliminated expulsion of the electrolyte material.

SUMMARY OF THE INVENTION

Accordingly, the present invention is directed to an electrochemical cell having an electrolyte fill port opening comprising a discontinuous opening with at least two welded sealing members positioned at differing depths within the fill port. The fill port opening is designed such that its diameter decreases with increasing opening depth into the cell. Such a smaller diameter within the cell further minimizes localized heating and reduces the possibility of electrolyte expulsion. In addition, the electrochemical cell comprises plate electrodes that are housed inside mating "clamshell" casing components. A lid or header assembly design is generally used in conjunction with the clamshell case, the lid containing both a hermetic glass-to-metal seal for a terminal lead, and a filling port.

A first sealing member is preferably positioned within the opening at a position between the top and bottom surfaces of the electrolyte fill port. The first sealing member is welded in position within the fill port using a first energy. A second sealing member is positioned within the opening at a distance away from the first sealing member and closer to the exterior opening of the fill port, i.e. the top surface of the lid or header. The second sealing member is welded into position at a welding energy that is greater than the welding energy used to weld the first sealing member. A lower welding energy is selected to close the first sealing member within the fill port opening and minimize localized heating of the electrolyte material that would result in electrolyte expulsion.

If more than two sealing members are positioned within the opening of the fill port, each additional sealing member is positioned a distance away from the previous sealing member and closer to the upper surface of the opening. These additional sealing members are welded into position using a welding energy that is about equal to, or greater than the welding energy used to seal the first sealing member. The first sealing member is positioned furthest away from the top or exterior surface of the header or cell sidewall. The electrolyte fill port is designed such that the innermost sealing member is welded using parameters that prevent leaking of the electrolyte. The second, third and fourth sealing members are welded into position such that a hermetic seal is created. The shape of the sealing member is non-limiting and may comprise a plate, a sphere or a plug. The sealing members are dimensioned such that they fit within the diameter of the fill port opening.

Each of the sequential sealing members is preferably welded utilizing different welding parameters. The inner most sealing member is welded into place utilizing a lesser amount of energy than subsequently welded sealing members that are positioned closer to the exterior opening of the fill port residing at the top surface of the header. Thus, by welding the inner sealing member in place at a lower energy, the inner sealing member is positioned within the fill port opening without the need to mechanically press the sealing member in place. In addition, the lower welding energy creates a seal that minimizes or prevents electrolyte from leaking due to thermal expansion of the cell components. Subsequent sealing members, that are closer to the exterior of the header, can thus be welded in place at increased energies to ensure a hermetic seal without causing electrolyte to expel from within the casing.

The foregoing and additional advantages and characterizing features of the present invention will become clearly apparent upon reading the ensuing description together with the included drawings wherein.

DETAILED DESCRIPTION OF THE INVENTION

Figure 1:
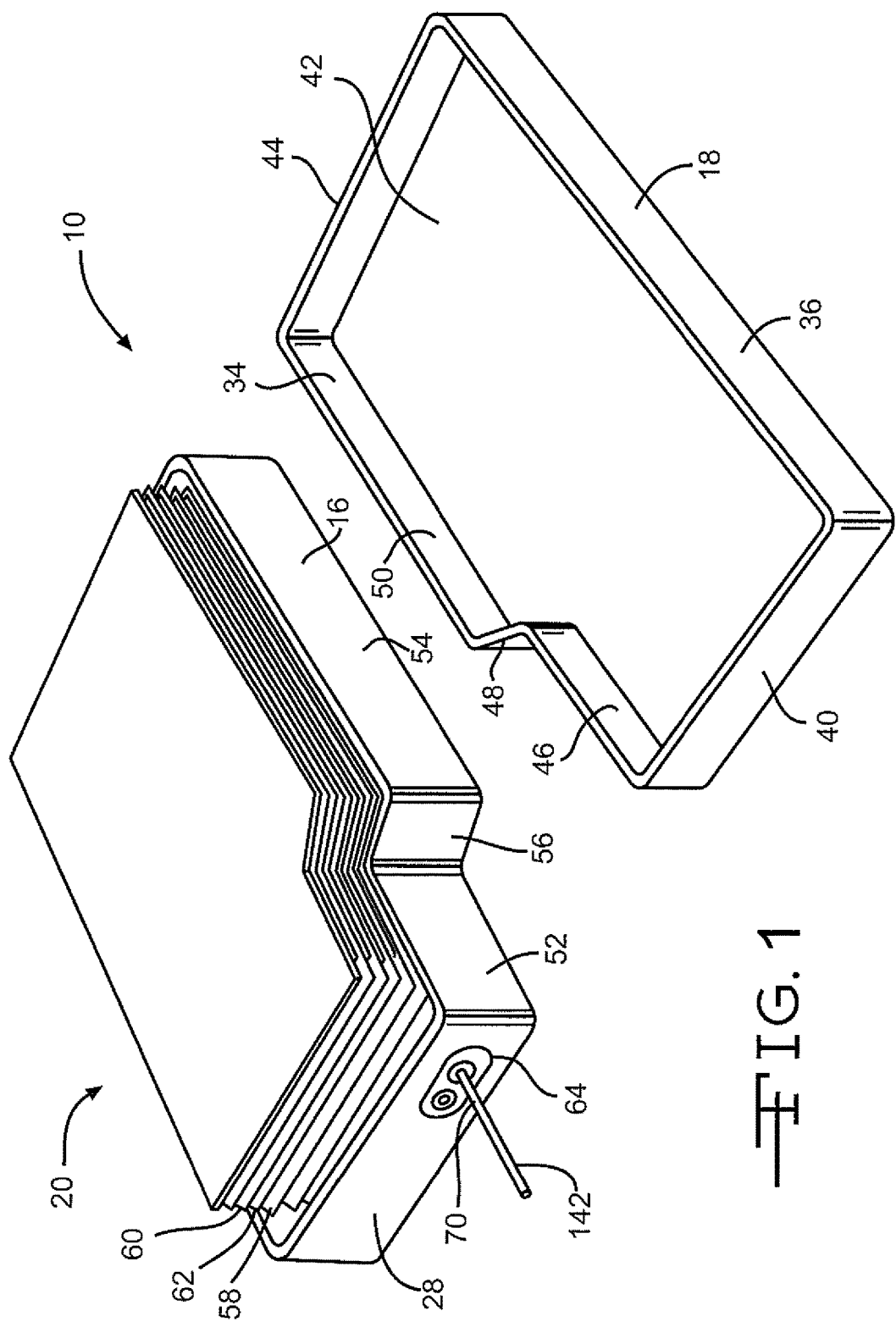
FIG. 1 is a perspective view of an embodiment of the electrochemical cell of the present invention.
Figure 2:
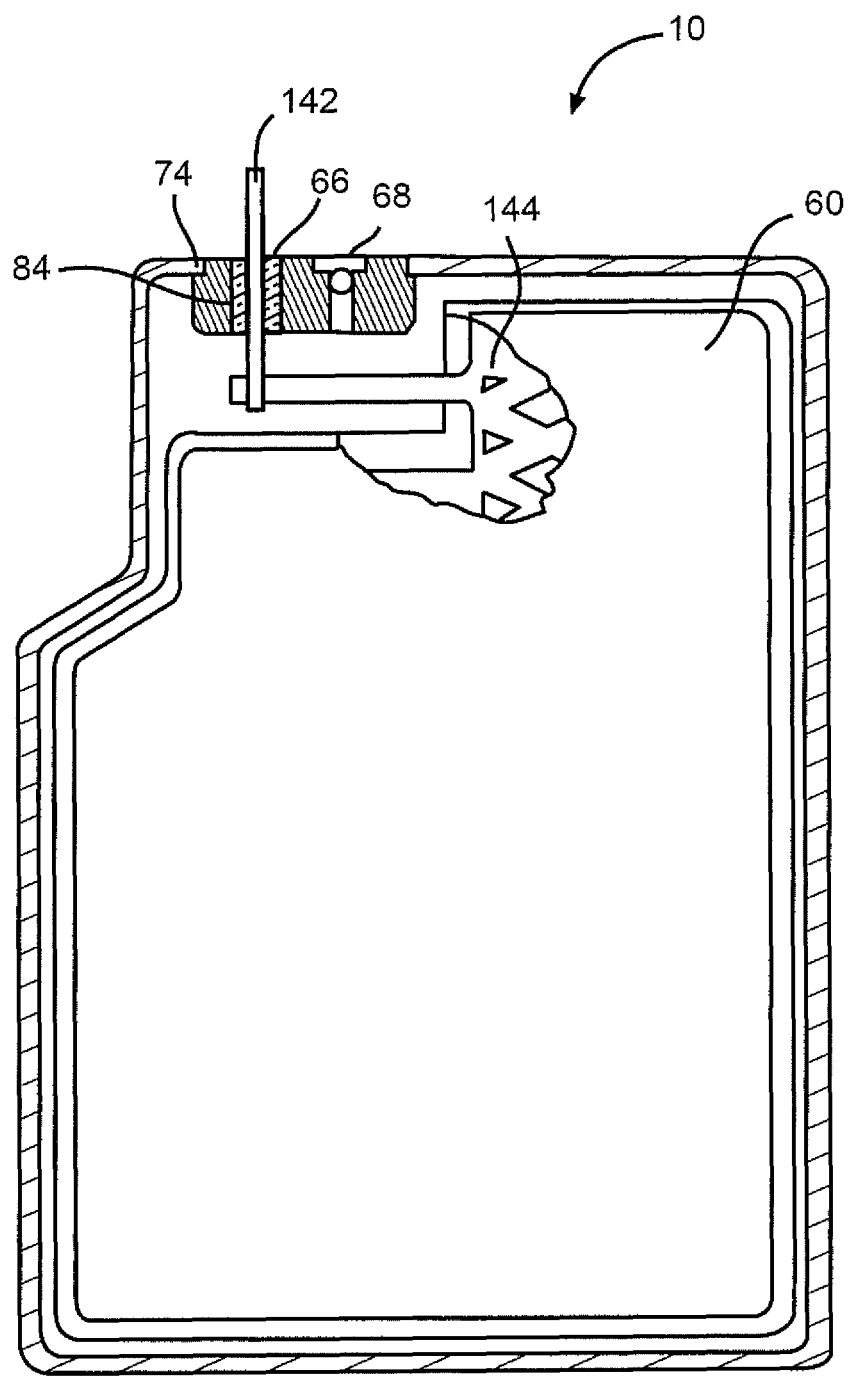
FIG. 2 is a cross-sectional view of the electrochemical cell shown in FIG. 1.
Figure 3:
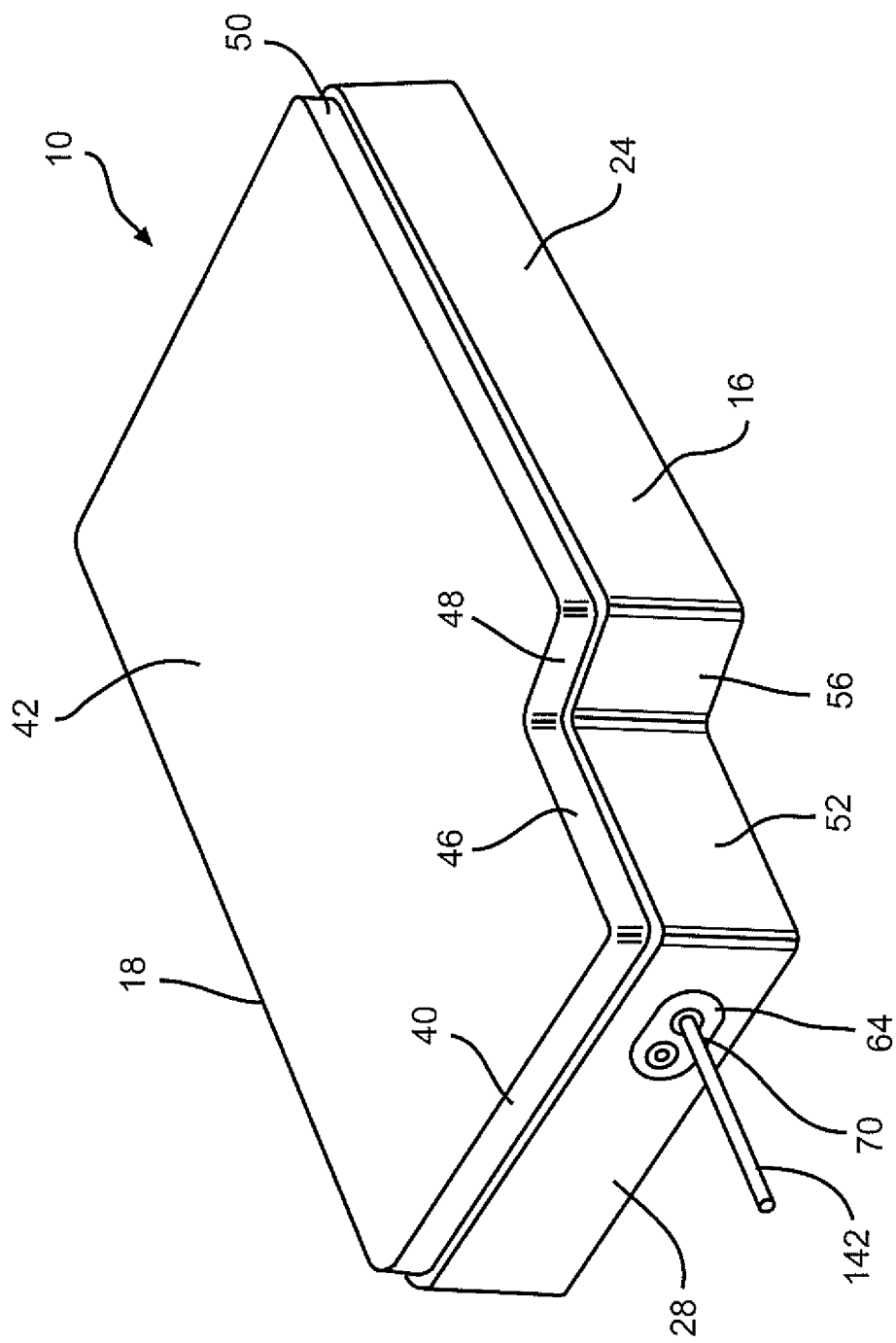
FIG. 3 illustrates a perspective view of an embodiment of the electrochemical cell of the present invention.

Turning now to the drawings, FIGS. 1-3 illustrate an embodiment of an electrochemical cell 10 having a header assembly 12 according to the present invention. The header assembly 12, which will be described in detail hereinafter, may comprise a one-piece construction or, alternatively be constructed of a multiple piece subassembly. First, the cell 10 includes a conductive casing of metal 14, such as stainless steel or titanium, having first and second clamshell portions 16 and 18. As shown in FIG. 3, the clamshell portions 16 and 18 are mated together and sealed about their periphery to provide a hermetic enclosure for an electrode assembly 20. The preferred methods of sealing are welding and brazing.

Figure 4:
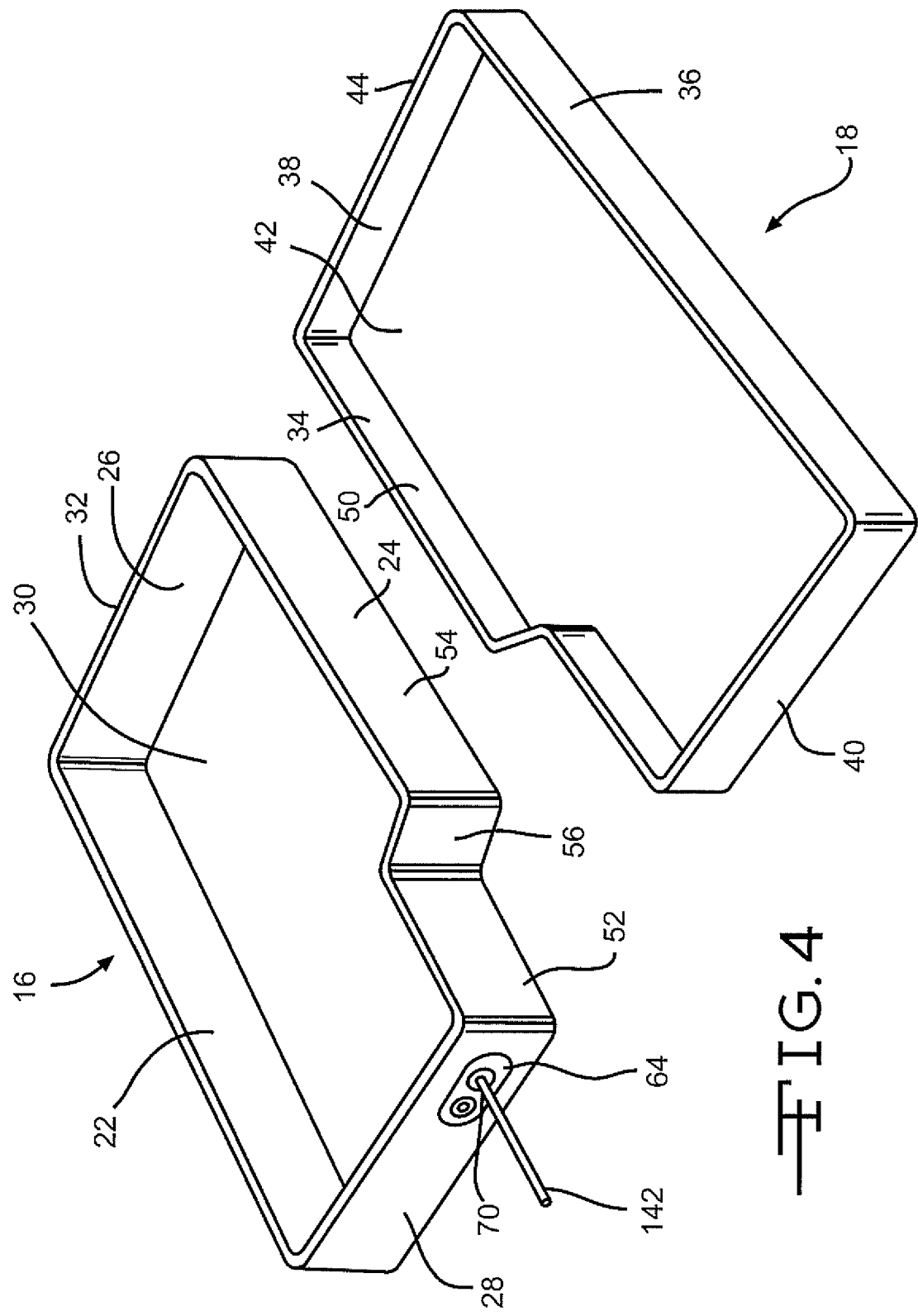
FIG. 4 shows a perspective view of an embodiment of the casing halves of the electrochemical cell shown in FIG. 3.
Figure 5:
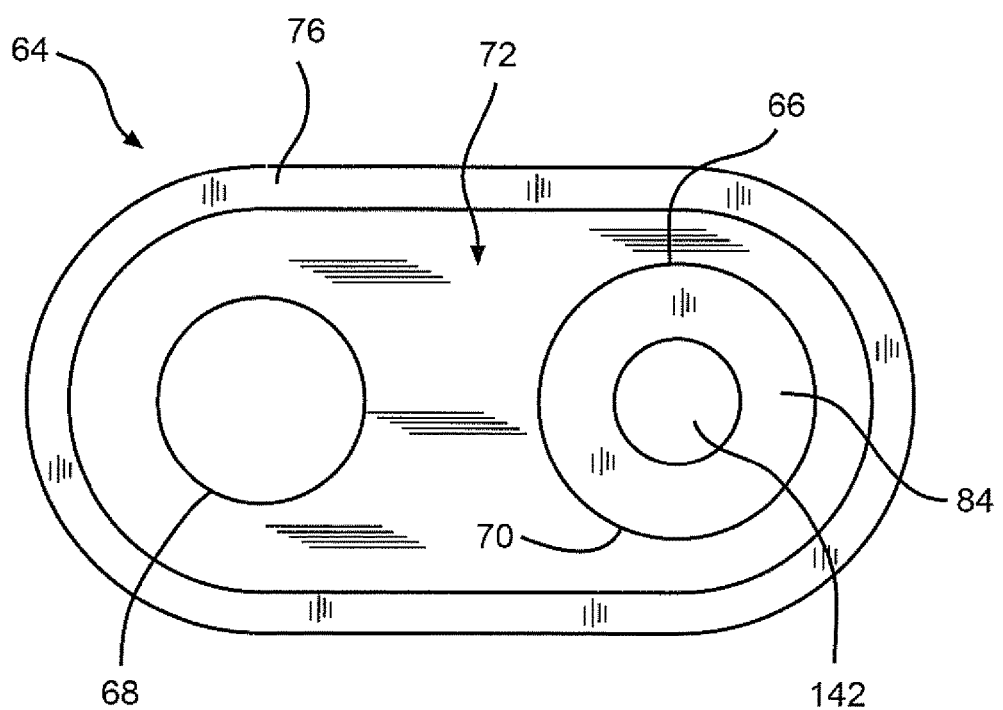
FIG. 5 shows a magnified top view of an embodiment of the electrochemical cell header assembly of the present invention.

In particular as shown in FIG. 4, the first clamshell 16 comprises spaced apart sidewalls 22 and 24 extending to and meeting with spaced apart end walls 26 and 28. The sidewalls 22, 24 and the end walls 26, 28 meet each other at curved corners and extend to a front wall 30. Opposite the front wall 30 is a continuous edge 32 of sidewalls 22, 24 and end walls 26, 28.

The second clamshell 18 (FIG. 4) comprises spaced apart sidewalls 34 and 36 extending to and connecting with spaced apart end walls 38 and 40. The sidewalls 34 and 36 and end walls 38 and 40 meet at rounded corners and extend to front wall 42. Opposite the front wall is a continuous edge 44 of the sidewalls 34 and 36 and end walls 38 and 40. End wall 38 has a greater length than end wall 40. In this manner, sidewall 34 includes a first portion 46 extending from end wall 40 and forming into an angled sidewall portion 48 which meets a second portion 50 of sidewall 34 extending to the end wall 38.

In one preferred embodiment of the present invention shown in FIG. 3, the second clamshell 18 is sized to fit inside the periphery of the first clamshell 16 in a closely spaced relationship. This means that sidewall 34 is somewhat shorter than sidewall 24, end wall 38 is somewhat shorter than end wall 26, sidewall 36 is somewhat shorter than sidewall 22 and end wall 40 is somewhat shorter than end wall 28. Also, the first and second portions 46 and 50 of sidewall 34 are sized to be received inside first and second portions 52 and 54 of sidewall 24 with the intermediate angled sidewall portion 48 of sidewall 34 aligned with and received inside of an intermediate angled sidewall portion 56 of sidewall 24.

In the embodiment of the present invention as further shown in FIG. 3, the second clamshell 18 is received and nested inside the first clamshell 16 in a closely spaced relationship. In that respect, the mating clamshells 16 and 18 of the present invention are stamped or otherwise formed from sheet metal to a shape desired for a particular application.

As shown in FIG. 1, cell 10 further includes an anode electrode, generally designated 58. The anode electrode 58 comprises an anode active material, such as lithium pressed to the opposite sides of an anode current collector. The anode current collector is fabricated from a thin sheet of metal such as nickel. The anode electrode 58 is in operative contact with a cathode plate 60 through a thin sheet of separator material 62. The separator surrounds and envelops the cathode body 60 to prevent direct physical contact with the anode 58.

As shown in FIGS. 1-3, 4 and 5, the case 14 may further contain the header or lid assembly 12 having an ellipsoidal shape and provided with a first feedthrough opening 66 and a second fill opening 68. The feedthrough opening 66 is used for a hermetically sealed battery terminal feedthrough 70 whereas the second fill opening 68 is used for an electrolyte fill opening. As shown in FIGS. 1-3, 4-5, 6A and 6B, the header assembly 12, more specifically the fill opening 68, may comprise a one-piece construction.

Figure 6A:
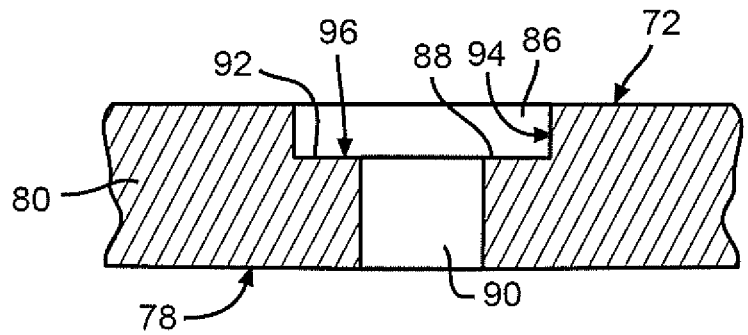
FIGS. 6A and 6B illustrate cross-sectional views of embodiments of an open electrolyte fill port of a one-piece construction.
Figure 6B:
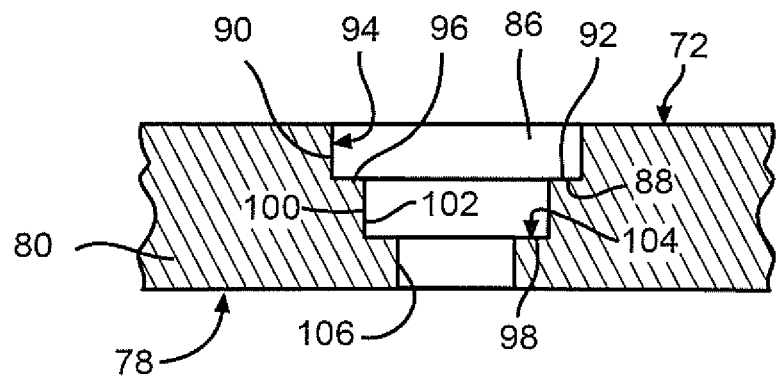
Figure 6C:
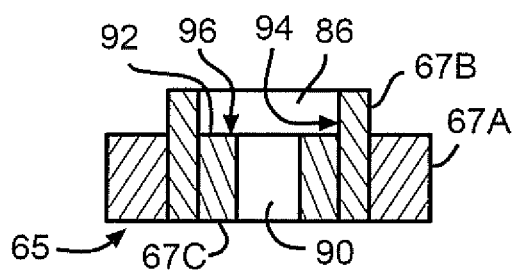
FIG. 6C shows a cross-sectional view of an embodiment of an open electrolyte fill port of a multi-piece construction.

Furthermore, the header 12, terminal feedthrough opening 66 or fill port opening 68 may comprise a multi-piece construction such as illustrated in FIG. 6C. The fill opening 68 of the header 12 may comprises a series of ferrules 67A, 67B, 67C that are joined together to form a fill port subassembly 64 (FIG. 6C). As shown in FIGS. 6A-C, the illustrated ferrules preferably comprise an elongated tubular form. The ferrules may be constructed having different lengths such as those depicted in FIG. 6C. Arranging ferrules of differing lengths can be used to create elongated openings of differing widths such as elongated openings 86 and 90. The multi-piece fill port subassembly 64 may be positioned at different locations within the electrochemical cell 10 since the fill port structure 68 is a separate unit.

Figure 11:
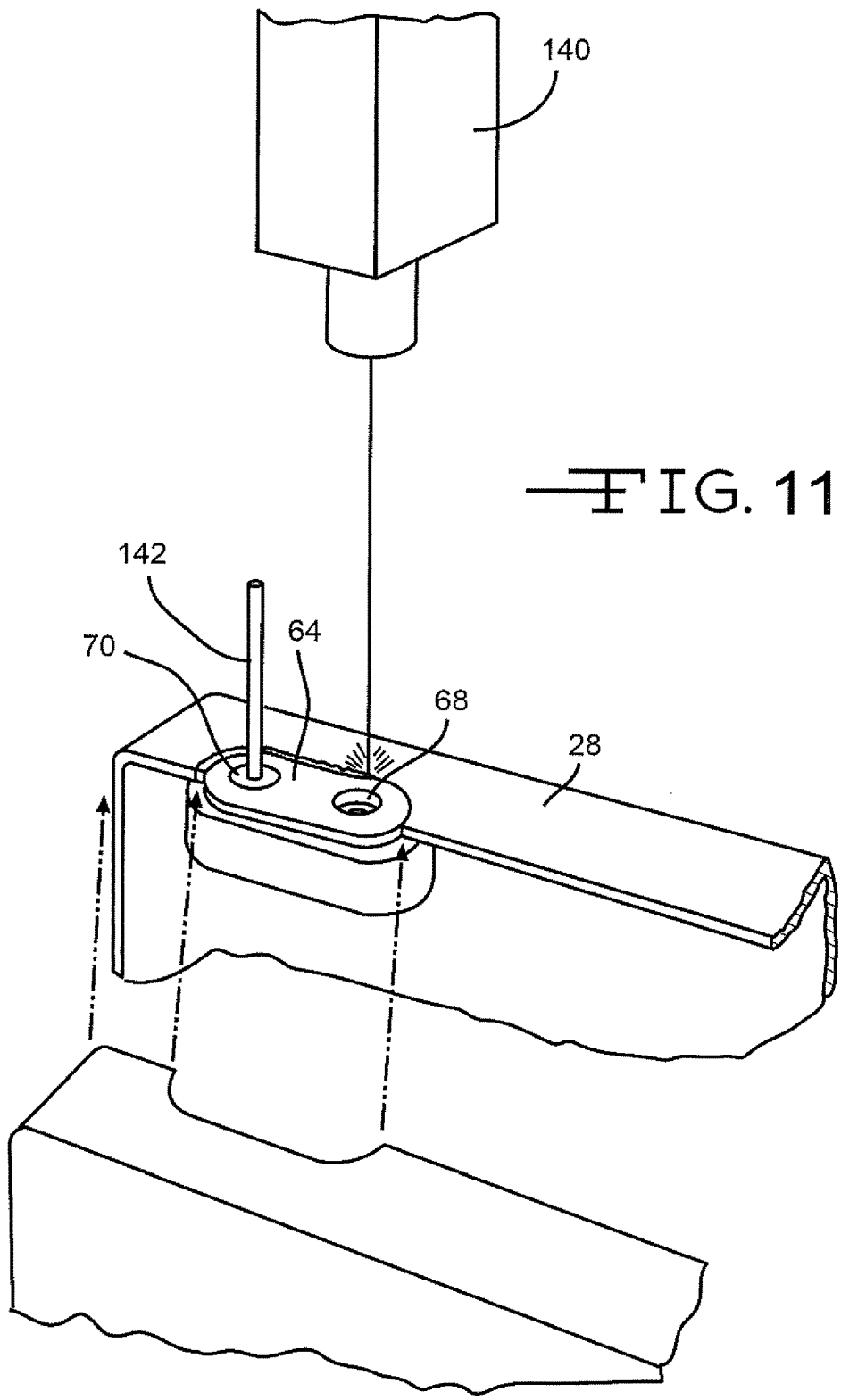
FIG. 11 illustrates a partially cut away view of an embodiment of welding the header assembly into the casing of an electrochemical cell.

In FIG. 2 an upper surface 72 of the header assembly 12 may be surrounded by a step 74 extending to and meeting with a sidewall 76. The sidewall 76 meets with a lower surface 78 at a rounded edge. The purpose of the step 74 is to assist in locating the header assembly 12 in the side face 28 of the clamshell portion 16. The body 80 of the assembly 12 may act as a heat sink to dissipate heat generated by welding or brazing of the assembly 12 in the clamshell halves 16 and 18. The welding method is shown in FIG. 11 and preferably utilizes a laser welding instrument 140 to form the various welds of the electrochemical cell 10. As those skilled in the art can appreciate, the header assembly 12 can be installed in either the first or second, or possibly in both the first and second clamshell halves 16 and 18, depending on the design of the battery system. There can be a number of embodiments of the assembly location.

The dimension of the step 74 depends on the type and nature of the battery and the case used therein. In general, the vertical dimension of the step 74 will be equal to the thickness of the battery case 14. As previously stated, the step 74 assists in finding the location of the assembly 12 in the wall of the battery casing 14. The step 74 maintains the assembly 12 in position whereby the upper surface 72 of the assembly is coplanar with the outer surface of sidewall 76, creating a smooth transition, which may be necessary in certain battery designs.

The feedthrough opening 66 of the header assembly 12 is further defined by a continuous opening of fixed radius. In that respect, the feedthrough opening 66 extends downwardly from the upper surface 72 and meets with lower surface 78 of the header 64. The continuous opening is used for the battery terminal feedthrough 70, and contains a glass-to-metal (GTM) seal 84.

As shown in FIGS. 6A-6C and 9A-9D, the electrolyte fill port opening 68, whether residing within header 12 or electrolyte fill port subassembly 64, is further defined by a discontinuous opening. An axis A-A extends perpendicularly through the discontinuous opening 68. As shown, the fill port opening 68 of header 12 (FIGS. 6A and 6B) and fill port subassembly 64 (FIG. 6C) have a first elongated opening 86 of fixed radius $r_1$ that extends downwardly from the upper surface 72 to an intermediate location between the upper surface 72 and bottom surface 78. At the intermediate location, the first elongated opening 86 passes through a first transition 88 to a second elongated opening 90 of radius $r_2$ (where $r_1 > r_2$). In a preferred embodiment, the first transition 88 comprises a first planar ledge portion 92 that extends from an interior sidewall surface 94 of the first elongated opening 86 toward the perpendicular axis A-A. The first planar ledge portion 92 forms a bottom interior surface 96 of the first elongated opening 86. The first ledge portion 92 preferably extends annularly around the top of the second elongated opening 90. As shown in FIGS. 6A, 9A, 9B and 9C, the second elongated opening extends further downward and meets with the lower surface 78 of the header assembly 12. In a preferred embodiment, the first and second elongated openings 86, 90 comprise a curved cross-section, more specifically a circular cross-section perpendicular to the axis A-A. However, the cross-section of the first and second elongated openings 86, 90 may be constructed of a non-limiting polygon shape such as a rectangle, a triangle or an octagon. The first and second elongated openings 86, 90 are co-axial.

In a further embodiment, as shown in FIG. 6B, the second elongated opening 90 extends further down from the first transition 88 to a second transition 98. In this embodiment, the second elongated opening 90 extends downward until it reaches the second transition 98. Like the first transition 88, the second transition 98 comprises a second planar ledge portion 100 that extends from an inner wall surface 102 of the second elongated opening 90 towards the perpendicular axis A-A. The second ledge portion 100 forms a bottom interior surface 104 of the second elongated opening 90. The second ledge portion 100 preferably extends annularly around a third elongated opening 106. The third elongated opening 106 having a radius $r_3$, extends further downward and meets with the lower surface 78 of the header assembly 12. The radius ($r_3$) of the third elongated opening 106 is preferably smaller than the radius ($r_2$) of the second elongated opening 90. In a preferred embodiment, the radius ($r_3$) of the third elongated opening 106 is also smaller than the radius ($r_1$) of the first elongated opening 86. In a preferred embodiment, the size of the radii of the first, second and third elongated openings 86, 90, 106 are constructed such that $r_1 > r_2 > r_3$. The first, second and third elongated opening 86, 90 and 106 are co-axial and extend about parallel to perpendicular axis A-A. Although it is not shown, it is contemplated that the second header opening 68 may comprise additional elongated openings of decreasing radii that extend and meet at additional transition locations within the fill opening 68 of the header 12. In addition, it is contemplated that the fill port subassembly 64 may also comprise additional elongated openings of decreasing radii that extends and meet at additional transition locations. Similar to the first and second elongated openings 86, 90, these additional elongated openings that extend within the header assembly 12, may comprise a cross-section of a multitude of polygon shapes.

In a preferred embodiment, the header assembly 12, particularly the header assembly 12 of a one-piece construction, can be manufactured by machining, powdered metallurgy, injection molding or by stamping. A sharp transition in the second opening 68 where the first ledge portion 92 of the elongated opening 86 constricts to the second elongated opening 90 is preferred because this construction produces a preferred flat welding surface. However, the first ledge portion 92 of the first transition 88 between the first elongated opening 86 and the second elongated opening 90 may be curved in a downwardly sloping manner. For an alternate closure structure, reference is drawn to U.S. Pat. Nos. 5,776,632 and 6,117,195, both to Honegger, the disclosures of which are incorporated herein by reference.

As previously mentioned, leakage of electrolyte and gases from an electrochemical cell caused by a compromised seal is extremely undesirable, and can even be fatal when the cell is used as the power source for an implantable medical device, and the like. In electrochemical cells having a metal casing, one means of providing a hermetic seal, as previously stated, for an electrolyte fill opening and the like, is by welding a seal member 108 in the casing 14 (FIGS. 7A, 7B, 8A, 8B and 8C). However, the casing 14 proximate to the weld conducts heat to the electrolyte contained therein and some electrolyte evaporation invariably occurs. When these gases escape from the cell casing 14 they are referred to as out gassed by-products and such escaping gases can leave pinholes in the weld, which may compromise hermeticity.

Figure 9A:
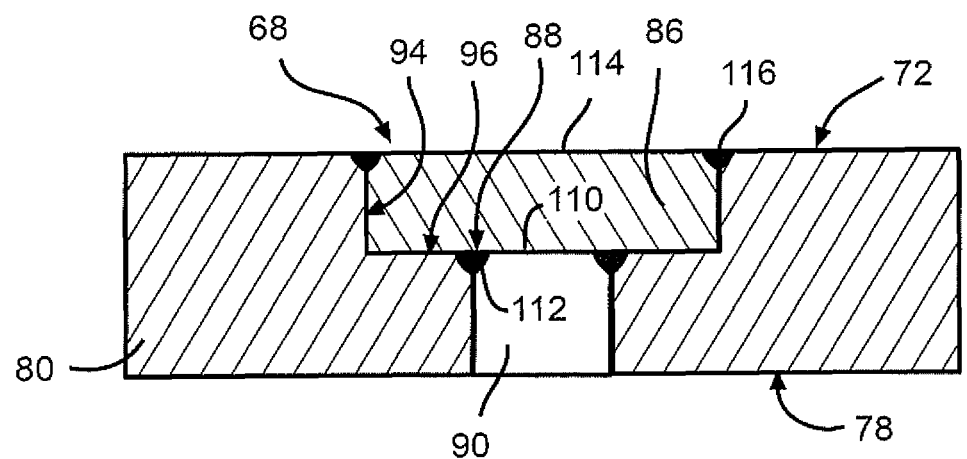
FIGS. 9A to 9D illustrate cross-sectional views of alternative embodiments of a closed electrolyte fill port.
Figure 9B:
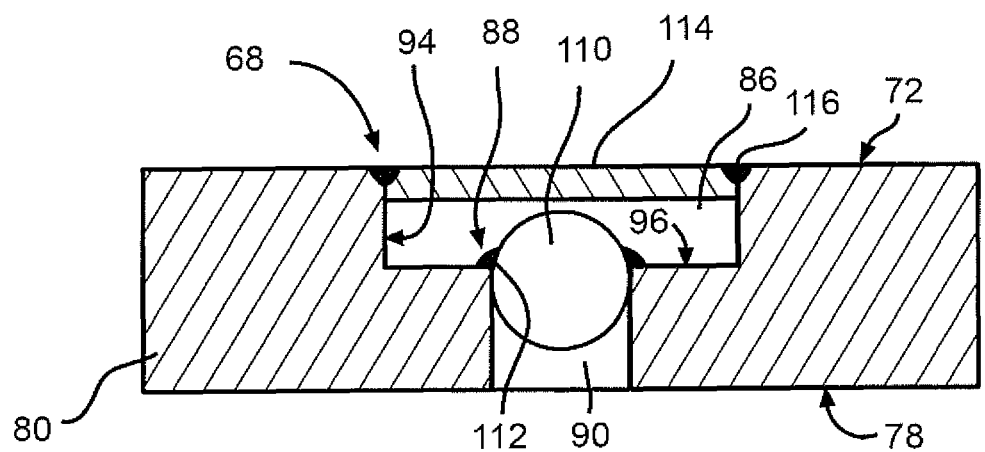
Figure 9C:
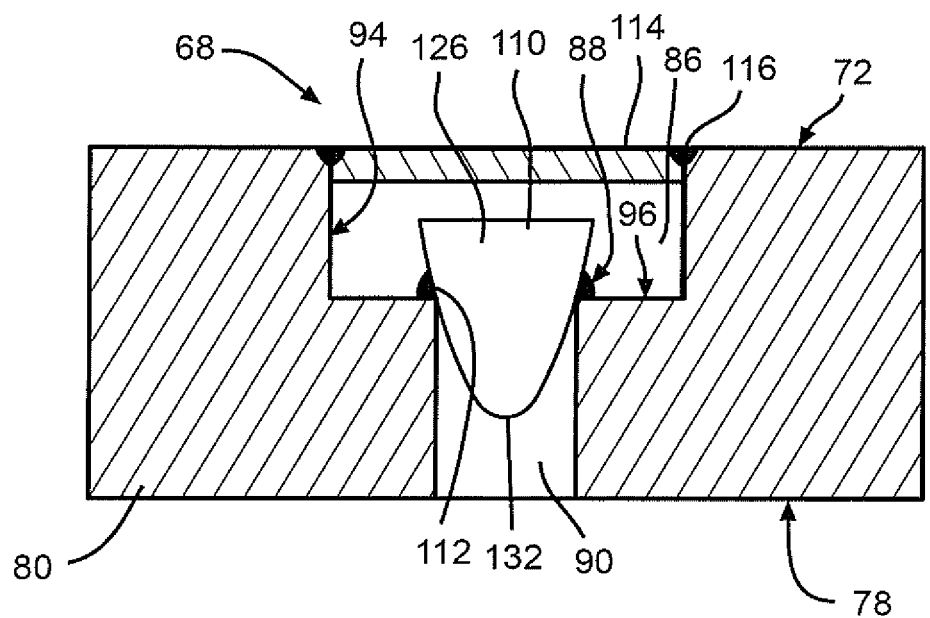

Thus, in the current invention, several embodiments of the sealing assembly 108 may be effective to close the second opening or fill port opening 68 of the header assembly 12 and assist to prevent compromise of the seal. As shown in FIGS. 9A, 9B, 9C, 10A and 10B, in a first embodiment, a first sealing member 110 is inserted within the second or fill port opening 68 of the header assembly 12. Specifically, the first sealing member 110 is positioned flush with, or slightly lower than, the bottom interior surface 96 of the first elongated opening 86. More specifically, the first sealing member 110 is positioned flush with, or slightly lower than, the first ledge 92 of the first transition 88 between the first and second elongated openings 86, 90. The first sealing member 110 is preferably welded into the sealing registry of the second elongated opening 90 of the electrolyte fill opening 68 forming a secondary seal 112 (FIGS. 9A, 9B, 9C). More specifically, the first sealing member 110 is seated over the top opening of the second elongated opening 90 as shown in FIG. 9A. Alternatively, the first sealing member 110 may be at least partially positioned within the top portion of the second elongated opening 90 as shown in FIGS. 9B, 9C. In either case, the first sealing member 110 is positioned such that the top opening of the second elongated opening 90 is closed.

In addition, a second sealing member 114 is also positioned over the first elongated opening 86 such that the fill port opening 68 at the exterior surface 72 of the header assembly 64 is closed. More specifically, the second sealing member 114 may be seated over the first elongated opening 68 or, alternatively, the second sealing member 114 may be at least partially positioned within the first elongated opening 86, as shown in FIGS. 9A, 9B, 9C, 10A and 10B. The second sealing member 114 is welded into place, forming a primary seal 116. In a preferred embodiment, both the first and second sealing members 110, 114 are constructed from a metallic material such as titanium, nickel, copper, MP35N or combinations thereof.

In a preferred embodiment, the primary weld 116 forms a hermetic seal that is redundant to the secondary weld 112 closing the top opening of the second elongated opening 90 within the header 12 or fill port assembly 64, thereby preventing flow of the electrolyte out of the casing 14. The secondary weld 112 may create a hermetic seal but is not required. In a preferred embodiment, the primary weld 116 is formed at a welding energy that is greater than the welding energy used to form the secondary weld 112. The secondary weld 112 is formed by using a first weld energy capable of joining the first sealing member 110 to that of the first ledge 92, but that is not of enough energy to cause the electrolyte material to evolve and expel out of the casing 14. In addition, the first weld is formed with a welding energy level so as to not cause the surrounding material within and around the header assembly 12 to deform and thereby not allow the electrolyte material to expel out of the casing 14. Furthermore, since the fill port opening 68 may be positioned in close proximity to the glass-to-metal seal 84, a lower welding energy is desired such that the welding energy does not melt or deform the GTM seal 84 and, thus, potentially compromise the hermeticity of the terminal feedthrough 70. In a preferred embodiment, the secondary weld 112 is created using a weld energy that ranges from about 1 Joule to about 2 Joules and the primary weld 116 is created using a weld energy that ranges from about 1.5 Joules to about 3 Joules.

Figure 9D:
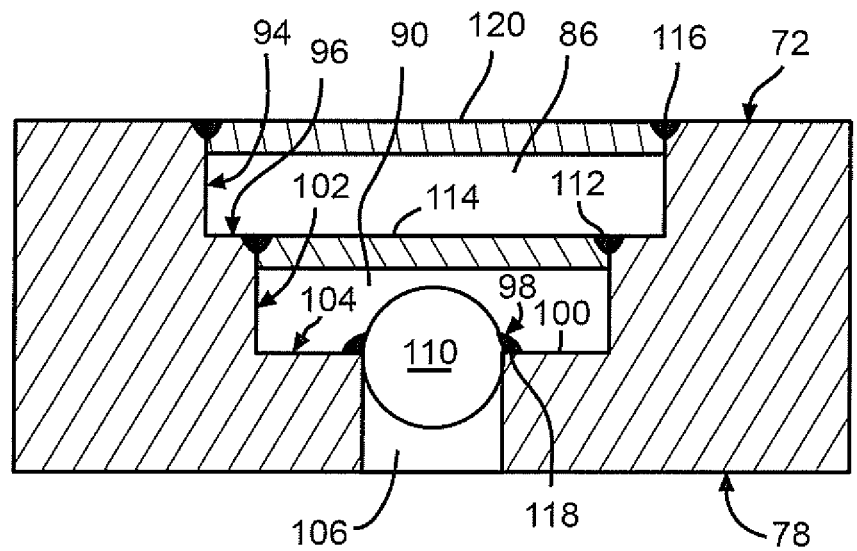
Figure 10A:
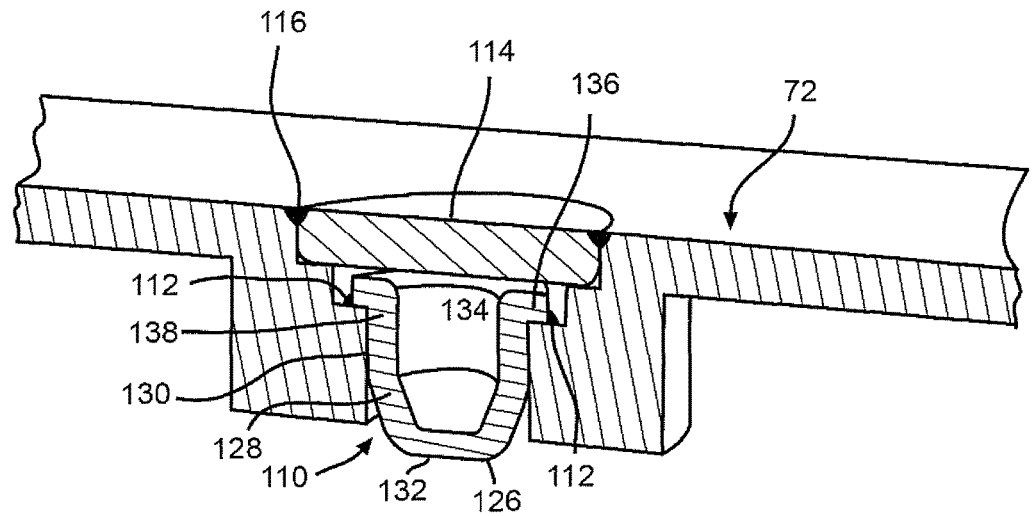
FIGS. 10A and 10B show partially cut away views of alternative embodiments of a closed electrolyte fill port utilizing a plug.
Figure 10B:
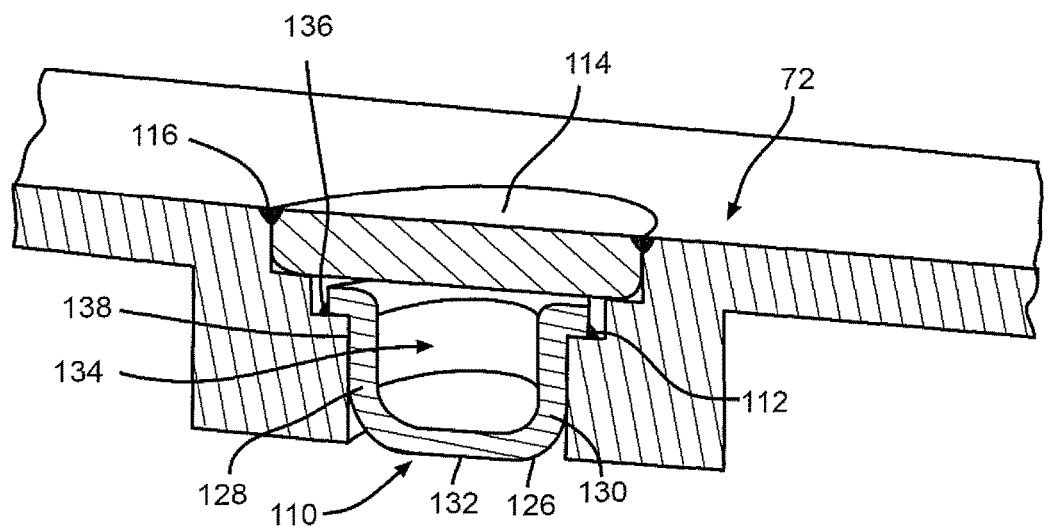

In an additional embodiment, illustrated in FIG. 9D, the first sealing member 110 is inserted in the fill port opening 68 such that the member 110 is positioned flush with or slightly lower than the bottom surface 104 of the second elongated opening 90 at the second transition 98. More specifically, the first sealing member 110 is positioned flush with or slightly lower than the second ledge 100. Furthermore, as shown in FIG. 9D, the sealing member may be positioned such that it is both above and below the bottom surface 104 of the second elongated opening 90 at the second transition 98. The first sealing member 110 is welded in position over the opening of the third elongated opening 106, thereby creating a tertiary weld 118.

The second sealing member 114 is positioned flush with or slightly lower than the bottom surface 96 of the first ledge 92 of the first transition 88. The second sealing member 114 is preferably welded in position over the top opening of the second elongated opening 90 creating the secondary weld 112. Finally, a third sealing member 120 is positioned flush with or slightly lower than the exterior opening of the first elongated opening 86. The sealing member 120 is welded into position over the first elongated opening 86, i.e. the exterior surface 72 of the assembly 12 or fill port assembly 64, creating the primary weld 116. The series of welds are designed such that the welding energy of the primary weld is greater than the secondary and tertiary welds 112, 118. Preferably, the welding energy of the secondary weld 112 is greater than the welding energy of the tertiary weld 118.

Figure 7A:
FIGS. 7A and 7B illustrate perspective views of different embodiments of sealing members.
Figure 7B:
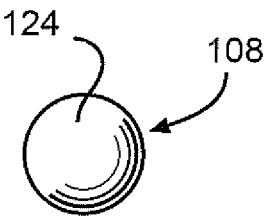
Figure 8A:
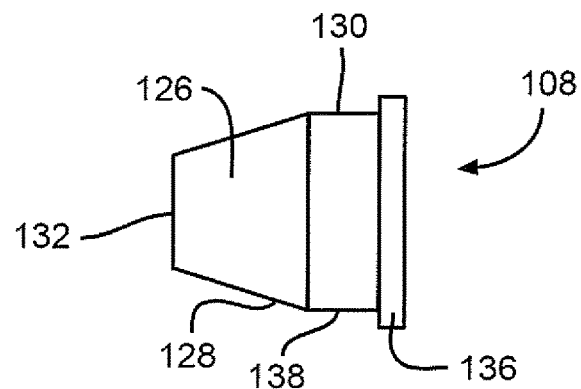
FIG. 8A illustrates a side view of an embodiment of a sealing member plug.
Figure 8B:
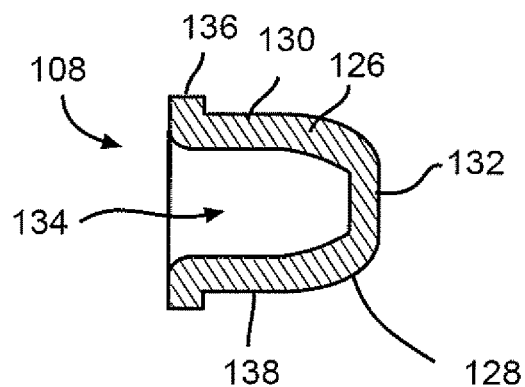
FIGS. 8B and 8C are cross-sectional views of alternative embodiments of sealing member plugs.
Figure 8C:
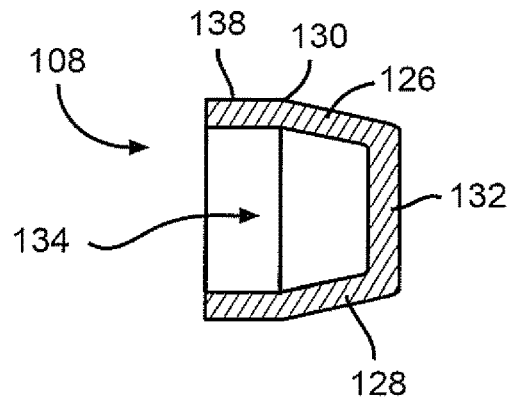

In a preferred embodiment, the first, second and third sealing members, 110, 114 and 120 may comprise a variety of non-limiting shapes. For example, the sealing members 110, 114, 120 may comprise a plate 122 (FIG. 7A) or a curved sphere 124 (FIG. 7B). The sealing members 110, 114, 120, may also comprise a plug 126 such as the embodiments shown in FIGS. 8A-8C, 9C, 10A and 10B. As illustrated the plug 126 comprises a plug body 128 having an annular plug sidewall 130 that extends from a plug top side 131 and meets at a plug bottom 132. The plug bottom 132 is dimensioned with a diameter such that it fits within the opening of the first, second and/or third elongated openings 86, 90, 106 of the fill port opening 68. Furthermore, the annular plug sidewall 130 may be dimensioned such as to fit within the elongated openings 86, 90, 106.

In an embodiment, the plug 126 may comprise a plug cavity 134 extending within the plug body 128. The plug 126 may further comprise a plug lip portion 136 that extends outwardly from an upper portion 138 of the annular plug sidewall 130. The plug lip 136 is positioned such that it is in contact with the upper surfaces of the ledge 92, 100. The plug lip 136 is designed to provide a welding surface and further prevent the expulsion of electrolyte from within the casing 14.

Now in FIG. 2, a terminal lead 142 of the terminal feedthrough 70 is connected to a cathode current collector 144 that extends through the glass-to-metal seal 84 fitted in the header assembly 12 supported in the wall 28 of clamshell 16. Terminal lead 142 is preferably the positive electrical terminal, being connected to the cathode electrode 60. The anode electrode 58 is in operative contact with the conductive casing through direct physical contact of the anode active material with the clamshells 16, 18.

For a typical lithium/silver vanadium oxide cell, the cathode current collector 144 is of titanium and terminal lead 142 is of molybdenum, and separators 62 are polypropylene. The activating electrolyte is a 1.0M to 1.4M solution of $LiAsF_6$ or $LiPF_6$ in a 50:50 mixture of, by volume, 1,2-dimethoxyethane and propylene carbonate. Glass seal 84 is of TA-23 hermetic sealing glass, while the casing clamshells 16, 18 may be of stainless steel, titanium or other metals. This electrochemical system is of a primary cell type. However, those skilled in the art will readily recognize that the casing 14 of the present invention is readily adapted to house both primary electrochemical systems of either a solid cathode or liquid catholyte type, or a secondary cell such as a lithium ion cell having a carbonaceous negative electrode and lithium cobalt oxide positive electrode. Other active and non-active materials may be used for other cell chemistries, as are well known by those skilled in the art.

Now use of the two stamped metal component configuration for the manufacture of the implantable grade lithium anode based electrochemical cells permits optimum utilization of available volume in an implantable medical device, yielding greater packaging efficiencies in smaller devices. In addition, the multiple welded sealing member 108 design of the header assembly 12 reduces or eliminates electrolyte leaking during manufacture. The result is a highly efficient power source with a doubly sealed electrolyte fill port that greatly reduces electrolyte weld contamination. Heretofore, the manufacturing process required many more steps to create a hermetically sealed cell capable of being implanted. The invention will enhance the art by decreasing manufacturing costs.

To manufacture the case it is necessary to appropriate the proper sheet thickness conductive metal and draw the individual halves by stamping or other such suitable means. The peripheral edges need to be trimmed, ensuring weld-ready continuous peripheral edges. In one embodiment, the header assembly 12 is positioned and welded within the first casing half 16. As previously mentioned, the header assembly 12 may comprise a one-piece construction or alternatively the header 12 may comprise an assembly of multiple pieces such as a series of ferrules 67A, 67B, and 67C. For example, FIGS. 6A and 6B illustrate a fill port opening 68 of a one-piece construction whereas FIG. 6C illustrates an embodiment of the fill port subassembly 64 of a multi-piece construction. In either case, after the header assembly 12 is positioned within the first casing 16, the header 12 is welded into position. The glass-metal seal 84 with terminal lead 142 is installed in the feedthrough opening 66 of the header assembly 64, and the header assembly is installed in the lower clamshell half 16 and welded using a laser welding instrument 140 (FIG. 11). The electrode assembly 20 is installed in the shell 16 that is then mated with the terminal lead 142 and second clamshell 18. The edges of the mated clamshells 16, 18 form a continuous peripheral surface, which, as previously described, is sealed by welding. The assembled casing housing 14 and the electrode assembly 20 is then filled with an electrolyte and the fill opening 68 is sealed. The remaining portion of the header assembly 64 is welded at the same time. This creates a hermetically sealed electrochemical cell assembly.

In practice, the fill opening 68 is sealed by first positioning the first sealing member 110 within the fill opening 68. The first sealing member 110 is positioned such that it is aligned with the first transition 88 within the elongated opening 86, 90, and 106. The laser welding instrument 140 is used to weld the first sealing member 110 in place and close the opening 68 at the first transition 88. This is done at a first energy that preferably ranges from about 1 Joule to about 2 Joules. In any event, it is important that this first weld energy be low, sufficient to affect the first weld, but low enough to significantly diminish the evaporation of electrolyte as the weld is being created. The result is a hermetic first seal.

Although unlikely, if electrolyte were to expel out of the opening 86, a cleaning process by which a liquid solution such as alcohol, or other cleaning chemical, may be used to clean excess electrolyte material from the closed opening 86, 90, 106. In addition, a brush or cloth (not shown) may be used to wipe up any excess electrolyte solution and/or cleaning solution.

Once the first sealing member 110 is welded into position, the second sealing member 114 is positioned within the fill port opening 68 such that it is aligned with the second transition 98. The laser instrument 140 is used to seal the second sealing member 114 in place. This is done at a second energy that preferably ranges from about 1.5 Joules to about 3 Joules. This energy range is sufficient to create a robust weld that is readily suitable for implantable application. Should for some reason there have been a pin hole in the first weld due to inadvertent electrolyte out-gassing, the second weld is a redundant structure that ensures a hermetic seal with robust integrity. Moreover, the present dual weld construction is an improvement over the previously discussed Paulot fill plug structure with just a fit-pressed lower plug. It's still possible for electrolyte out-gassing to impact welding of the upper plug. Such is not possible with the present dual welded plug construction. If desired, subsequent sealing members are positioned within the second opening 68 and the laser welding instrument 140 is used to seal them in place until the final sealing member 108 is positioned and the fill opening 68 is hermetically sealed.

While the present header assembly 12 has been described with respect to a clamshell casing design, that is for illustrative purposes only. In a broader sense, the present header is useful with any casing designs including prismatic, cylindrical and button shapes which afford access to the inside of the casing other than through the opening intended to receive the header. For example, U.S. Pat. No. 5,474,859 to Takeuchi et al., which is assigned to the assignee of the present invention and incorporated herein by reference, describes a cell housed in a cylindrical casing having a bottom wall and an upper lid or cover. The header of the present invention is useful with this type of cylindrical casing.

While preferred embodiments of the present invention have been disclosed, it will be appreciated that it is not limited thereto, but may be otherwise embodied with the scope of the following claims.

What is claimed is:

1. An electrochemical cell, which comprises:
   a) a casing comprising a casing sidewall having a header opening;
   b) a header hermetically sealed to the casing sidewall in the header opening, the header having a thickness extending from a bottom header surface to a top header surface, wherein the header comprises an electrolyte fill opening, the electrolyte fill opening comprising:
      i) a first opening portion comprising a first opening sidewall extending upwardly from the bottom header surface to a first ledge,
      ii) wherein the first ledge extends laterally from an upper edge of the first opening sidewall to a second opening portion,
      iii) the second opening portion comprising a second opening sidewall extending upwardly from the first ledge to a second ledge,
      iv) wherein the second ledge extends laterally from an upper edge of the second opening sidewall to a third opening portion; and
      v) the third opening portion comprising a third opening sidewall extending upwardly from the second ledge to the upper header surface,
      vi) wherein the first, second and third opening portions have respective first, second and third diameters aligned substantially perpendicular to the header thickness with the first diameter being less than the second diameter, and with the second diameter being less than the third diameter;
   c) an electrode assembly housed inside the casing, the electrode assembly comprising an anode prevented from direct physical contact with a cathode by an intermediate separator, wherein the anode and cathode are activated with an electrolyte filled into the casing through the electrolyte fill opening;
   d) a first sealing member comprising a lower annular plug sidewall extending upwardly to an annular lip, the annular lip having a fourth diameter that is greater than the first diameter of the first opening portion, but less than the second diameter of the second opening portion, wherein, with the annular lip contacting the first ledge, the annular plug sidewall of the first sealing member is in a seal-contact relationship with the first opening sidewall, and wherein the lip of the first sealing member is welded to the header to thereby close the first opening portion; and
   e) a second sealing member dimensioned to fit in the third opening portion, wherein the second sealing member is welded to the header to thereby close the third opening portion and create a hermetically sealed casing at the electrolyte fill opening.

2. The electrochemical cell of claim 1 wherein the first sealing member is characterized as having been welded to the first ledge of the header at a first welding energy and the second sealing member is characterized as having been welded to the header at a second welding energy, the second welding energy being greater than the first welding energy.

3. The electrochemical cell of claim 2 wherein the first welding energy ranges from about 1 Joule to about 2Joules and the second welding energy ranges from about 1.5Joules to about 3 Joules.

4. The electrochemical cell of claim 1 wherein the first and second sealing members are composed of a metallic material selected from the group consisting of titanium, nickel, copper, MP35N, and combinations thereof.

5. The electrochemical cell of claim 1 wherein the second sealing member comprises a sphere or a plate.

6. The electrochemical cell of claim 1 wherein the first, second and third opening portions are coaxial.

7. The electrochemical cell of claim 1 comprising a primary or secondary chemistry.

8. The electrochemical cell of claim 1 wherein the second sealing member has a fifth diameter that is in a contact relationship with the third diameter of the third opening sidewall.

9. An electrochemical cell, which comprises:
   a) a casing comprising:
      i) a first metal casing member having a first surrounding sidewall extending to and meeting with a first major face wall; and
      ii) a second metal casing member having a second surrounding sidewall extending to and meeting with a second major face wall;
   b) a header supported by at least one of the first and second casing members, the header having a thickness extending from a bottom header surface to a top header surface, wherein the header comprises an electrolyte fill opening, the electrolyte fill opening comprising:
      i) a first opening portion comprising a first opening sidewall extending upwardly from the bottom header surface to a first ledge,
      ii) wherein the first ledge extends laterally from an upper edge of the first opening sidewall to a second opening portion,
      iii) the second opening portion comprising a second opening sidewall extending upwardly from the first ledge to a second ledge,
      iv) wherein the second ledge extends laterally from an upper edge of the second opening sidewall to a third opening portion; and
      v) the third opening portion comprising a third opening sidewall extending upwardly from the third ledge to the upper header surface,
      vi) wherein the first, second and third opening portions have respective first, second and third diameters aligned substantially perpendicular to the header thickness with the first diameter being less than the second diameter, and with the second diameter being less than the third diameter;
   c) wherein a first outer edge of the first surrounding sidewall faces the second major face wall with the first surrounding sidewall being in a hermetically sealed relationship with the second surrounding sidewall to thereby seal the first and second casing members together; and
   d) an electrode assembly housed inside the casing, the electrode assembly comprising an anode prevented from direct physical contact with a cathode by an intermediate separator, wherein the anode and cathode are activated with an electrolyte filled into the casing through the electrolyte fill opening;

e) a first sealing member comprising a lower annular plug sidewall extending upwardly to an annular lip, the annular lip having a fourth diameter that is greater than the first diameter of the first opening portion, but less than the second diameter of the second opening portion, wherein, with the annular lip contacting the first ledge, the annular plug sidewall of the first sealing member is in a seal-contact relationship with the first opening sidewall, and wherein the lip of the first sealing member is welded to the header to thereby close the first opening portion; and f) a second sealing member dimensioned to fit in the third opening portion, wherein the second sealing member is welded to the header to thereby close the third opening portion and create a hermetically sealed casing at the electrolyte fill opening.

10. The electrochemical cell of claim 9 wherein the first sealing member is characterized as having been welded to the first ledge of the header at a first welding energy and the second sealing member is characterized as having been welded to the header at a second welding energy, the second welding energy being greater than the first welding energy.

11. The electrochemical cell of claim 9 wherein the second sealing member comprises a sphere or a plate.

12. The electrochemical cell of claim 9 wherein the first sealing member has a cavity extending from the annular lip to a lower cavity portion surrounded by the lower annular plug sidewall where the cavity meets a plug bottom wall.

13. The electrochemical cell of claim 9 wherein the first, second and third opening portions are coaxial.

14. A method of providing an electrochemical cell, the method comprising the steps of:
a) providing an electrode assembly comprising an anode prevented from direct physical contact with a cathode by an intermediate separator;
b) providing a casing comprising:
  i) a first casing member having a first surrounding sidewall extending to and meeting with a first major face wall; and
  ii) a second casing member having a second surrounding sidewall extending to and meeting with a second major face wall; and
c) providing a header having a thickness extending from a bottom header surface to a top header surface, wherein the header comprises an electrolyte fill opening, the electrolyte fill opening comprising:
  i) a first opening portion comprising a first opening sidewall extending upwardly from the bottom header surface to a first ledge,
  ii) wherein the first ledge extends laterally from an upper edge of the first opening sidewall to a second opening portion,
  iii) the second opening portion comprising a second opening sidewall extending upwardly from the first ledge to a second ledge,
  iv) wherein the second ledge extends laterally from an upper edge of the second opening sidewall to a third opening portion; and
  v) the third opening portion comprising a third opening sidewall extending upwardly from the second ledge to the upper header surface,
  vi) wherein the first, second and third opening portions are coaxial and have respective first, second and third opening diameters aligned substantially perpendicular to the header thickness with the first diameter being less than the second diameter, and with the second diameter being less than the third diameter;

d) welding the header to one of the first and second casing members;

e) positioning the electrode assembly in one of the first and second casing members;

f) mating the first casing member to the second casing member with the first surrounding sidewall in an overlapping relationship with the second surrounding sidewall and then welding the first and second casing members together and to the remainder of the header that is not welded to the one of the first and second casing members;

g) filling the casing with an electrolyte through the electrolyte fill opening to thereby activate the electrode assembly;

h) providing a first sealing member comprising a lower annular plug sidewall extending upwardly to an annular lip, the annular lip having a fourth diameter that is greater than the first diameter of the first opening portion, but less than the second diameter of the second opening portion;

i) positioning the first sealing member in the first opening portion so that the annular plug sidewall is in a seal-contact relationship with the first opening sidewall with the annular lip contacting the first ledge and then welding the first sealing member to the header to thereby close the first opening portion; and j) providing a second sealing member and then positioning the second sealing member in the third opening portion followed by welding the second sealing member to the header to thereby close the third opening portion and creating a hermetically sealed casing at the electrolyte fill opening.

15. The method of claim 14 wherein the first sealing member is characterized as having been welded to the first ledge of the header at a first welding energy and the second sealing member is characterized as having been welded to the header at a second welding energy, and further providing the first welding energy being less than the second welding energy.

16. The method of claim 15 further providing the first welding energy being from about 1 Joule to about 2 Joules and the second welding energy being from about 1.5 Joules to about 3 Joules.

17. The method of claim 14 further cleaning the first sealing member after welding it to the header and before welding the second sealing member.

18. The method of claim 14 wherein the second sealing member comprises a sphere or a plate.

19. An electrochemical cell, which comprises:
a) a casing comprising a casing sidewall having a header opening;
b) a header hermetically sealed to the casing sidewall in the header opening, the header having a thickness extending from a bottom header surface to a top header surface, wherein the header comprises:
  i) an electrolyte fill opening comprising a first opening portion comprising a first opening sidewall extending upwardly from the bottom header surface to a first ledge,
  ii) wherein the first ledge extends laterally from an upper edge of the first opening sidewall to a second opening portion, iii) the second opening portion comprising a second opening sidewall extending upwardly from the first ledge to a second ledge,
iv) wherein the second ledge extends laterally from an upper edge of the second opening sidewall to a third opening portion; and
v) the third opening portion comprising a third opening sidewall extending upwardly from the second ledge to the upper header surface,
vi) wherein the first, second and third opening portions are coaxial and have respective first, second and third diameters aligned substantially perpendicular to the header thickness with the first diameter being less than the second diameter, and with the second diameter being less than the third diameter; and
viii) the header further comprising a feedthrough opening supporting a feedthrough assembly comprising a terminal pin supported by an insulating material sealing between the feedthrough opening and the terminal pin, wherein the terminal pin extends from a proximal pin end located inside the casing to a distal pin end outside the casing;
c) an electrode assembly housed inside the casing, the electrode assembly comprising an anode prevented from direct physical contact with a cathode by an intermediate separator, wherein the anode and cathode are activated with an electrolyte filled into the casing through the electrolyte fill opening, and wherein one of the anode and the cathode is electrically connected to the proximal pin end of the terminal pin with the other of the anode and cathode being electrically connected to the casing;
d) a first sealing member comprising a lower annular plug sidewall extending upwardly to an annular lip, the annular lip having a fourth diameter that is greater than the first diameter of the first opening portion, but less than the second diameter of the second opening portion, wherein, with the annular lip contacting the first ledge, the annular plug sidewall of the first sealing member is in a seal-contact relationship with the first opening sidewall, and wherein the lip of the first sealing member is welded to the header to thereby close the first opening portion; and
e) a second sealing member dimensioned to fit into the third opening portion, wherein the second sealing member is welded to the header to thereby close the third opening portion and create a hermetically sealed casing at the electrolyte fill opening.

20. The electrochemical cell of claim 19 wherein the first sealing member is characterized as having been welded to the first ledge of the header at a first welding energy and the second sealing member is characterized as having been welded to the header at a second welding energy, the second welding energy being greater than the first welding energy.

21. The electrochemical cell of claim 19 wherein the second sealing member comprises a sphere or a plate.

22. The electrochemical cell of claim 19 comprising a primary or secondary chemistry.

* * * * *